UNITED STATES PATENT OFFICE.

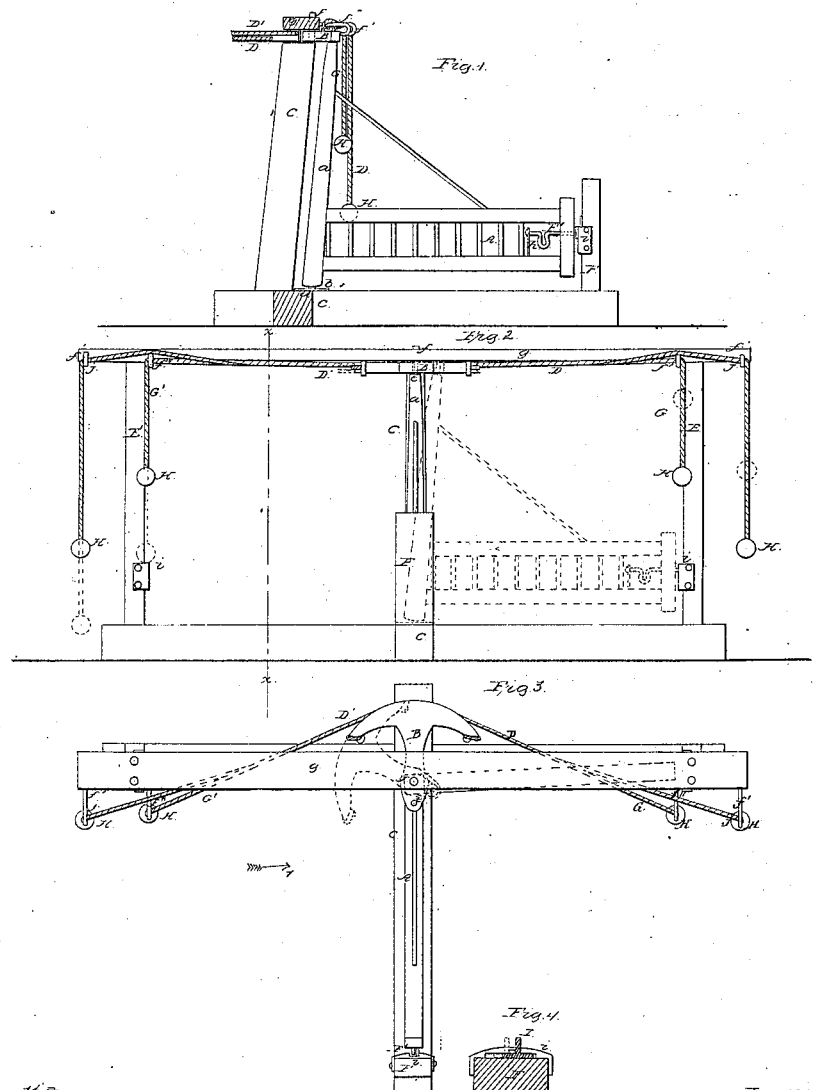

REUBEN R. COOL, OF MILLEN'S BAY, NEW YORK.

IMPROVEMENT IN GATES.

Specification forming part of Letters Patent No. 41,760, dated March 1, 1864.

*To all whom it may concern:*

Be it known that I, R. R. COOL, of Millen's Bay, in the county of Jefferson and State of New York, have invented a new and Improved Opening and Closing Mechanism for Gates; and I do hereby declare that the following is a full, clear, and exact description of the same, reference being had to the accompanying drawings, making a part of this specification, in which—

Figure 1 is a vertical section of my invention, taken in the line $x\ x$, Fig. 2; Fig. 2, an elevation of the same; Fig. 3, a plan or top view of the same.

Similar letters of reference indicate corresponding parts in the several figures.

This invention relates to an improved means for opening and closing gates without alighting from a horse or getting out of a vehicle.

To enable those skilled in the art to make and use my invention, I will proceed to describe it.

A represents a gate, which may be constructed in any proper way. The inner post, $a$, on which the gate turns, has inclined position, so that its upper end, which extends some distance above the gate, will project over toward the outer and free or disengaged end of the gate, as shown clearly in Fig. 1. This post $a$ has a journal, $b$, at its lower end, which is stepped in a sill-piece $c$, as shown at $d$, and the upper end of said post $a$ has a journal, $e$, which is fitted in a horizontal segment, B, the latter working on a pivot, $f$, in the upper end of a post, C, which is inclined so as to be about parallel with the post $a$ of the gate, when the latter is closed, as shown in Fig. 1. The journal $e$ of the post $a$ is fitted in the inner end of the segment B, and to the outer end of said segment two cords or chains, D D′, are attached, which extend from the segment in opposite directions, and pass through guides $f'$ at the ends of a horizontal bar, $g$, which is attached to the post C and to posts E E, at equal distances from C, and from a post, F, with which the latch F′ of the gate engages when the latter is closed.

The cords or chains D D′ have each a supplemental chain, G G′, attached to them, which also pass through guides $f''$, attached to the bar $g$, and the ends of the cords or chains D D′ G G′ have each a ball, H, secured to them.

The latch F′ is simply a slide-bolt, attached at its inner end to a spring, $h$, and catching into recesses or notched plates $i$, attached to the posts E E′ F.

I is a sliding catch on the post F, which as the gate closes, from either direction, arrests it at the proper position for the latch F′ to enter the notch of the plate $i$. This sliding catch is more clearly shown in Fig. 4, which represents an enlarged horizontal sectional view. The cords or chains D D′ have knots $j$ tied in them to serve as stops, by coming in contact with the guides $f'$, and preventing the cords or chains D D′ from being pulled or drawn beyond a certain extent.

The operation is as follows: When the gate is closed, the latch F′ is engaged with the notched plate $i$ of the post F, as shown clearly in Figs. 1 and 3, and the rider or driver, in approaching the gate in the direction indicated by arrow 1, pulls the cord or chain G′, which turns the segment B so that it will assume the position shown in red in Fig. 3, and throw the upper journal, $e$, of the post $a$ over and out of line with the lower journal, $b$, so that the gate will open by its own gravity and swing toward the post E, and be retained in this open position by the latch F′ engaging with the notched plate $i$, attached to said post, as shown in red in Fig. 2. After the horse or vehicle has passed through the gate the rider or driver pulls the cord or chain D, and thereby causes the gate to swing back to a closed state. A rider or driver, in approaching the gate in the opposite direction, pulls the cord or chain G, in order to open the gate, and pulls the cord or chain D′ to close it. It will be perceived that the segment B, as it first moves, raises the outer end of the gate, and thereby frees the latch F′ from the notched plate $i$, with which it is engaged.

I am aware that gates have been hung on segments or eccentrics, by turning which the journals of the posts on which the gate swings are thrown out of line, and the gate thereby made to open and close by its own gravity; but, so far as I am aware, said segments or eccentrics have never been applied to an oblique gate-post, as herein described, whereby the gate is made to open and close with a comparatively limited movement of the post $a$, and the gate rendered more sensitive—that is to say, quicker to act—than by the original arrangements.

I would remark that the knots $j$ prevent the segment B from being turned too far in either direction, so that the gate in closing cannot pass the post F.

I am aware that it is common to open and close gates by throwing the suspension out of the perpendicular by means of hand-ropes, so as to cause the gate to swing by its own gravity in either direction desired.

I do not claim, broadly, or separately, the segment B, irrespective of the post $a$ and the arrangement herein shown and described; but I do claim as new and desire to secure by Letters Patent—

The combination of the swinging gate A, segment B, cords or chains D D', post F, and sliding catch I, all arranged to operate substantially as and for the purposes specified.

REUBEN R. COOL.

Witnesses:
 HUGH DICK,
 WM. GARLAND.